A. SAUNDERS.
Screw-Cutting Dies.
No. 154,346. Patented Aug. 25, 1874.
*Fig 1.*
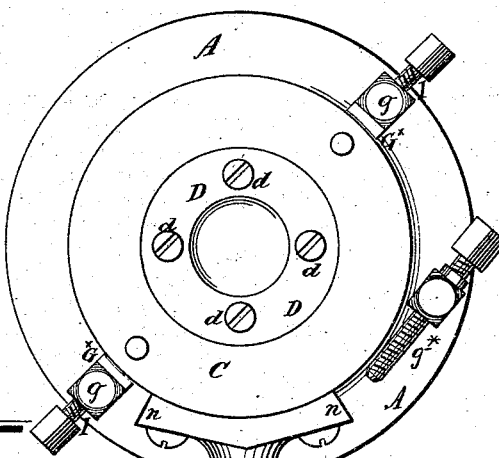
*Fig 4.*
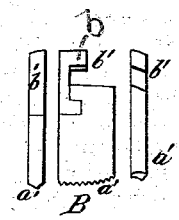
*Fig 2.*
*Fig 3.*
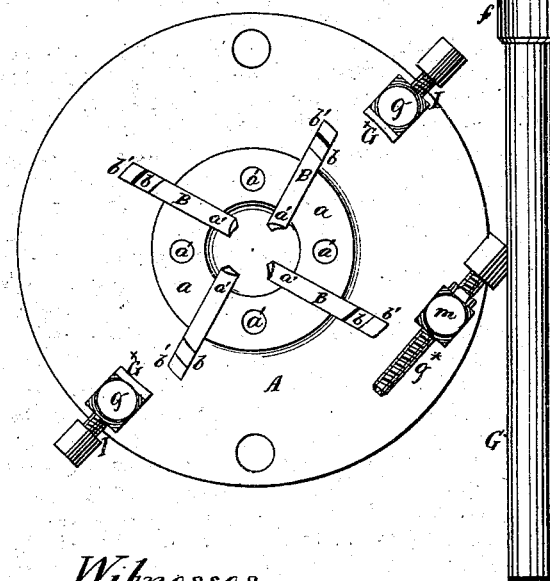
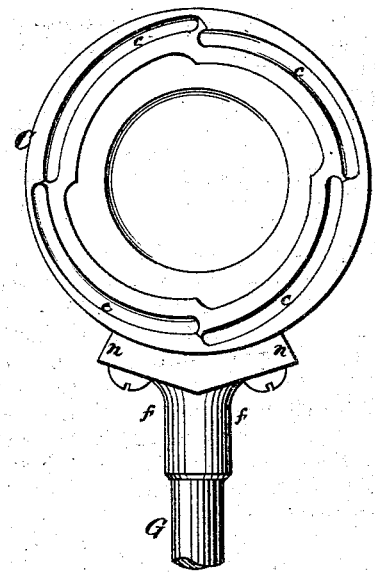
*Witnesses.*
James A Whitney
William B. Phair
*Inventor.*
Alex Saunders

UNITED STATES PATENT OFFICE.

ALEXANDER SAUNDERS, OF YONKERS, NEW YORK.

IMPROVEMENT IN SCREW-CUTTING DIES.

Specification forming part of Letters Patent No. 154,346, dated August 25, 1874; application filed April 9, 1874.

*To all whom it may concern:*

Be it known that I, ALEXANDER SAUNDERS, of Yonkers, in the county of Westchester and State of New York, have invented certain Improvements in Screw-Cutting Dies, of which the following is a specification:

This invention relates to that class of dies for screw-cutting, designed for use upon a lathe, and provided with radially-moving cutting or threading jaws. The invention consists in a novel combination of parts, whereby is provided a chuck of the class specified, in which the jaws may be retained in any desired position simply by a frictional pressure applied to their actuating-plate, in which, by suitably-provided positive stops, the movement of the said plate, and consequently of the jaws, in either direction, may be adjusted and kept within due limits, and in which the implement in its general structure is made strong and compact, and capable of the most efficient operation.

Figure 1 is a face view of a screw-cutting die, made according to my invention. Fig. 2 is a face view of the die-carrying portion of the same with the actuating-face removed, and Fig. 3 is an obverse view of the said actuating-plate.

A is a solid circular disk, fitted for attachment in any usual or appropriate way to the head of a suitable lathe, and furnished at its inner side with a boss, $a$, slotted or recessed radially to provide guides for the cutting or threading jaws B, each of which has an upwardly-projecting stud, $b$, fitting into a cam-groove, $c$, in the actuating-plate C, shown detached in Fig. 3. This plate C is held in place upon the other by a collar, D, itself retained by set-screws $d$ screwing into nuts $a'$ provided in the boss $a$. By turning the plate C axially upon the other, the cam-grooves will move the jaws in or out, according as the plate C is moved one way or the other, and to a degree proportioned to the sweep of the said plate when thus turned. In order to provide a means whereby this movement may, on occasion, be given to the plate C, it is provided in its periphery with a radial socket at $f$, into which may be thrust the lever G. The disk A is of greater diameter than the plate C, so that it projects beyond the edge of the latter, as shown in Fig. 1. Each of the jaws B is formed of two parts, the one, $a'$, having the screw-cutting teeth formed upon its inner end, and its other extremity provided with a rabbet and recess, as shown in the central view of Fig. 4, into which is interlocked the correspondingly-shaped inner end of the other portion $b'$ of the jaw. This part $b'$ has provided upon it the upwardly-projecting stud $b$, hereinbefore referred to.

By thus constructing the jaws each in two parts firmly fitted together, but yet detachable, the part $a'$, when its cutting-teeth are worn and defaced, may be removed and replaced by another, thereby avoiding the necessity of throwing away the whole jaw, which would otherwise exist.

In the use of the die, which is more particularly designed for cutting screw-threads upon steam-pipes and upon gas-pipes, it is essential, especially in the class of work just referred to, that the plate C, and consequently the cutting-jaws B, should be automatically retained without liability of slipping back in any position to which they may be brought. To secure this result friction-blocks $G^\times$ are provided to bear against the opposite edges of the plate C, these blocks being preferably faced with leather, and being attached to the inner ends of adjusting-screws I working through fixed nuts $g$ provided upon the surface of the disk A, projecting, as hereinbefore set forth, beyond the circumference of the plate. The pressure of these friction-blocks against the plate C being adjusted to the requisite degree, the said plate, and consequently the jaws actuated thereby, will be automatically retained in any position to which they may be brought by the turning of the plate with reference to the disk A and as the exigencies of the work may require.

It is also necessary that the movement of the plate C upon the disk A should be confined within certain limits, in order that the stud $b$ of the cutting-jaws shall not be injured by contact with the ends of the cam-grooves $c$, and also that the depth of the thread formed upon the pipe may be regulated or adjusted. To this end there is provided upon the circumference of the plate C, preferably upon opposite sides of the socket $f$, two shoulders, $n$. One of the fixed nuts $g$ is so placed, as in addition to its function previously set forth, to serve as a stop, which, by the striking against it of the adjacent shoulder $n$, limits the movement of the plate C in one direction. Fixed upon the disk A, as shown in Fig. 2 is a nut, $m$, through which passes a screw, $g^x$, which, by the contact of the other of the shoulders $n$, limits the movement of the plate in the direction opposite that just hereinbefore described. As this screw may be moved in or out to permit greater or secure less movement to the plate C, it constitutes an adjustable stop by which the limit of inward movement of the threading or cutting jaws, and consequently the depth of the screw-thread formed upon the pipe, may be regulated at will.

What I claim as my invention is—

The combination, as herein described and shown, of the adjustable friction-blocks $G^x$, the fixed stop $g$, the screw $g^x$ working through a fixed nut or bearing on the jaw-carrying disk A, and itself forming an adjustable stop, the shoulders $n$ abutting one on each side of the radial handle-socket $f$, the whole arranged for operation with the jaw-carrying disk A, the jaw-actuating plate C, and the radially-moving jaws B operated from the eccentric grooves $c$ of the plate C, for the purpose set forth.

ALEX. SAUNDERS.

Witnesses:
JAMES A. WHITNEY,
WILLIAM B. PHAIR.